F. KOCH.
PROCESS AND APPARATUS FOR MAKING TIPS ON LACES.
APPLICATION FILED JAN. 29, 1914.
1,148,971.
Patented Aug. 3, 1915.
2 SHEETS—SHEET 1.
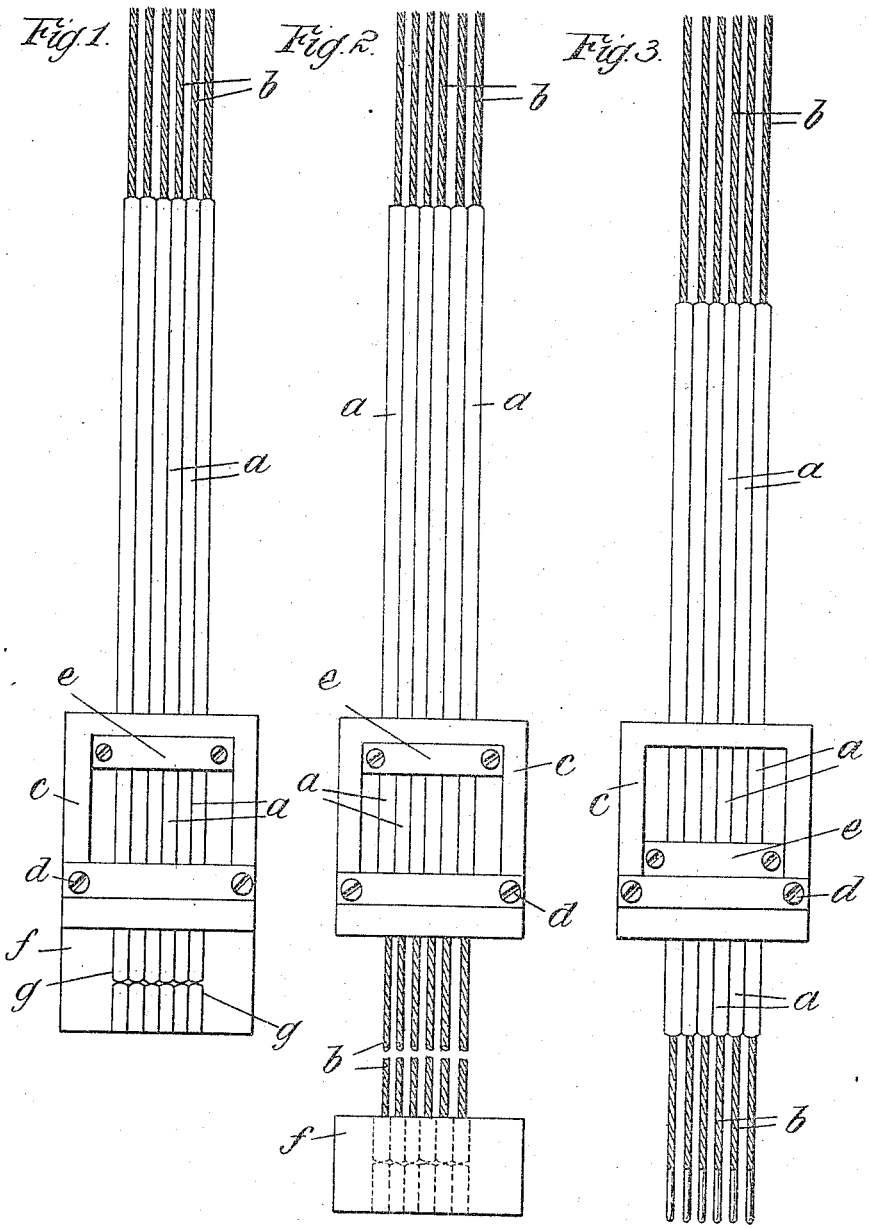
WITNESSES:
George Du Bou
Louis Alexander
INVENTOR
FRIEDRICH KOCH
BY
ATTORNEYS F. KOCH.
PROCESS AND APPARATUS FOR MAKING TIPS ON LACES.
APPLICATION FILED JAN. 29, 1914.
1,148,971.
Patented Aug. 3, 1915.
2 SHEETS—SHEET 2.
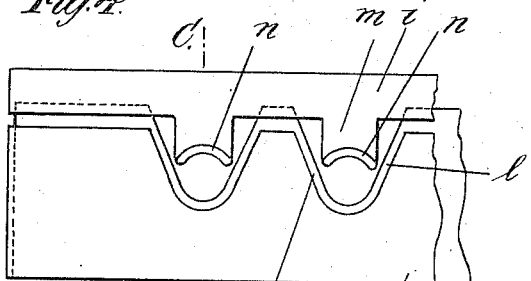
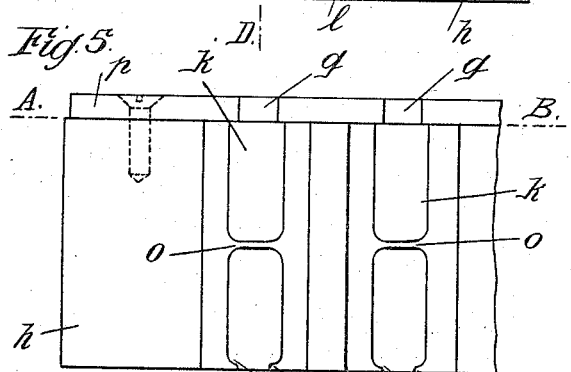
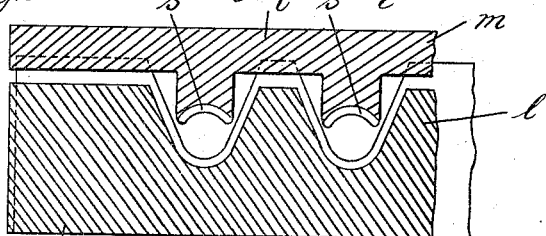
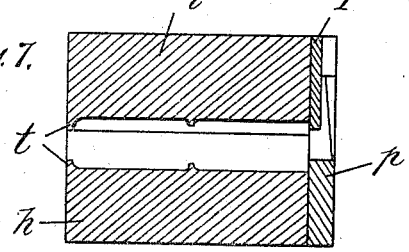
WITNESSES:
George Du Bon
Louis Alexander
INVENTOR
FRIEDRICH KOCH
BY
Biesen Knauth
ATTORNEYS

UNITED STATES PATENT OFFICE.

FRIEDRICH KOCH, OF FRANKFORT-ON-THE-MAIN, GERMANY.

PROCESS AND APPARATUS FOR MAKING TIPS ON LACES.

1,148,971.　　　　　Specification of Letters Patent.　　Patented Aug. 3, 1915.

Application filed January 29, 1914. Serial No. 815,326.

*To all whom it may concern:*

Be it known that I, FRIEDRICH KOCH, merchant, citizen of the German Empire, and resident of Frankfort-on-the-Main, Germany, with the post-office address, Feldbergstrasse 98, have invented new and useful Improvements in Processes and Apparatus for Making Tips on Laces, of which the following is a specification.

Tips of celluloid or the like have hitherto been fixed on laces by pressing short tubular pieces of celluloid thereon. One procedure has been to draw a cord of twice the length of a lace through a celluloid tube which is twice as long as the tip; the tube is pressed firmly and cut through the middle by hand. This method has the disadvantage that it must be applied by hand and it takes much time since each time the cord has to be threaded through a new tube by hand.

According to the present invention the affixing of the tip occurs quite automatically as a continuous manufacturing operation. Cords unwound from bobbins are drawn through long tubes of celluloid or the like; from the end of each tube the tip is pressed onto the cord and cut off, one tip being thus formed at each operation, or more advantageously two, which are cut through at the middle of their combined length in the pressing die in known manner. While the cords with the tips thereon are held firmly in the pressing die the tubes are moved backward along said cords through a distance corresponding with the length of a lace, whereby a lace is marked off from the cord. The celluloid tubes together with the cords are then again moved forward, and the ends of the tubes together with the cords are automatically introduced into the pressing die. In one apparatus there may be arranged in this manner a large number of tubes with lace cords and each may be operated upon simultaneously, so that the cost of production is remarkably small.

A specially constructed pressing die is advantageous for the practice of the process. Hitherto celluloid tips have been pressed on to laces by means of dies, each part of which is similarly formed with working faces semicircular in cross section. This die has the objection that as soon as the material surrounding the cord becomes warm, as the result of the pressure, the cord is pressed laterally through the material; when using tubes which in the present case alone come into consideration and which as is known can never be delivered of uniform dimensions, the least deviation scarcely detectable by the naked eye, particularly in the internal diameter, will result in the above objectionable possibility. The present invention avoids this defect completely and permits a satisfactory pressing of the tips without any danger of the cord being squeezed through the surrounding material. This is achieved by so constructing the two part pressing die that one of the parts is trough-shaped, the trough being deep and having sides inclined toward each other or diverging outwardly; thus the tube surrounding the cord when pressed from above always rolls the cord more closely or compactly together thus pressing the material firmly around the cord and preventing any lateral spread thereof through said material. The other part of the die which exerts this pressure is formed with projecting ridges which enter into and coöperate with the deep trough. The excess of celluloid is pushed on to the inclined sides of the trough, care being taken that the two parts of the die close upon one another closely at the front, whereby the celluloid cannot be squeezed through any opening in the front, and the cord is cut through. This arrangement is of particular importance when both tips are to be made at one pressing operation. If the celluloid could be squeezed forward there would be produced between the tips on the same cord celluloid rings difficult to remove.

The accompanying drawings illustrate one form of apparatus for practising the process.

Figures 1–3 are elevations showing parts of the apparatus in three different positions. Figs. 4–7 show the pressing die drawn to an enlarged scale, Fig. 4 being a front elevation, Fig. 5 a plan of the lower die, Fig. 6 a section on line A—B of Fig. 5 and Fig. 7 a section on line C—D of Fig. 4.

The long celluloid tubes $a$ lie side by side and through them pass the lace cords $b$ as they leave the bobbins. A frame $c$ contains a slide $e$ which clamps all the celluloid tubes so that it can carry these with it when it is operatively actuated. The clamp may be of any suitable kind; for example the tubes may be held between two correspondingly formed parts fastened together by screws or pressed together by means of a lever. On one side of the frame $c$ there is a relatively fixed clamp $d$ which is formed like slide $e$ and holds the celluloid tubes relatively stationary when the slide e is moved back again in the frame in the course of the operation. Coöperating with the frame c is a pressing die f which consists of two parts having grooves g for pressing the celluloid tips. In the example shown this die is as long as two tips and the grooves are so formed that by pressing them together the celluloid tube lying between them is firmly pressed on the lace cord which extends through the tube and is cut through in the middle together with the cord b. In this manner two tips for two successive laces are made at the same time. The die is so formed that the cut tip ends are rounded off ready for use.

The apparatus works as follows: The slide e in the initial position is at the upper end of the frame c, as shown in Fig. 1 when looking at the apparatus as illustrated in the drawings, the celluloid tubes a projecting through the said slide. The parts of the slide e are now pressed together to clamp the tubes a and the slide is moved downwardly in the frame c, carrying the celluloid tubes with it and causing the ends thereof to project beyond said frame c. In the example illustrated, the distance through which the movement occurs corresponds to twice the length of one tip. The die f which up to this stage has been open is now closed and presses the celluloid tubes firmly on the cords so that simultaneously the tubes and the cords are separated at the middle of the die and clamped therein. Then the clamp d which up to the present time has been open is closed to clamp the tubes a and the clamp of the slide e opens to release the same so that the slide may be returned to its original position in the frame c, this return movement of the slide being along the tubes which remain in place and relatively stationary. In order now to draw the lace cords through the tubes to the desired length of cord, the frame, together with its slide and the tubes clamped therein, is drawn backward or upward in the drawings through the desired distance, along the cords which are firmly held against movement in the pressing die by the tips. It would also be possible to move the pressing die toward the right through the distance corresponding with the desired length of cord and thus to draw this length out of the tubes held firmly in the slide.

As explained, the slide with the tubes clamped therein is drawn backward or upward through a distance corresponding with the desired length of the laces while these are held against movement by the die, the latter during this operation remaining relatively stationary so that the parts occupy the relative positions shown in Fig. 2. The die f is now opened to release the finished tips therein and thus free the laces after which the frame c is drawn downwardly to the same amount. Then the clamp d is opened to release the tubes a and the slide e is again clamped thereon after which the said slide e is moved downwardly again in the frame c through a distance corresponding with the length of two tips and carries with it the tubes and cords through this distance pushing the front free ends of the tubes into the pressing die, which is now again operated to squeeze up the tips from the celluloid tubes and at the same time cuts the cords and finishes the tips. The edge of the pressing die which is turned toward the celluloid tubes is so formed that in the pressing operation a separation of the pressed length of tubes constituting the tips from the remainder of the tubes takes place.

The pressing die consists of a lower die h and an upper die i. In the lower die h is cut a series of depressions k, having slides l inclined to each other or diverging outwardly. The bottom of the groove is circular in cross section corresponding with the diameter of the celluloid tube to be pressed. The upper die i has a number of projecting ribs m which are adapted to enter into the depressions k of the lower die and are curved to the same radius on their lower surfaces.

In the example shown two celluloid tips are simultaneously formed from one length of the celluloid tube pushed on to the cord, for which purpose the upper and lower dies have at o a rib which cuts or separates the material in the die in two at the middle into two tips and forms them hemispherically and incloses them. The lower die has on its side a sort of comb p which serves to close the hollow of the die so far that only the cord can pass out. For this purpose the cavities q between the teeth of the comb have only such breadth that the cord can pass through, while the celluloid tubes come into contact with the teeth of the comb and are prevented from passing beyond same whereby the formation of a bur is prevented. Moreover, the upper die has on its rib m a comb r whose teeth, as is apparent at s, project to the extent of the thickness of the wall of the celluloid tube over the rib so that the formation of a bur is avoided also in the upper die.

During the pressing of the celluloid tubes which extend into the dies the excess of celluloid is pushed laterally against the inclined walls of the lower die and here forms a thin bur which can very easily be separated later. On the front end, however, there is no such bur, for here it is prevented by the two combs of the upper and lower dies. As shown in Figs. 5 and 7 the two dies are so arranged that on the other side of the die at t the tubes are cut through so that two completely finished tips are produced. If only short tubes which are approximately as long as the die itself are used instead of long tubes as shown then the upper and lower dies must also be provided on their other sides with projecting combs so that the celluloid is prevented from issuing at this place and forming a bur.

Having thus described my invention and the best means I know of carrying the same into practical effect, I claim:—

1. The process of constructing tips for laces and applying same which consists in threading the lace through a continuous tube of tip material, separating a section of said tube therefrom and compressing said section upon said lace to combine it therewith and form the tip.

2. The process of constructing tips for laces and applying same which consists in drawing the lace from a source of supply, threading it through a continuous tube of tip material, separating a section of said tube therefrom and compressing it upon said lace to form a tip at one end thereof, moving said tube of material along said lace to a predetermined extent in a direction away from said finished tip, separating a second section from said tube and cutting said lace and compressing said second tube section upon said lace to complete the same and form a tip at the opposite end thereof.

3. The process of constructing tips for laces and applying same which consists in drawing the lace from a source of supply, threading it through a continuous tube of tip material, separating a section of said tube corresponding to the length of two tips, compressing said section upon said lace and cutting through the said section and said lace to complete a preceding lace and the tip at one end thereof and to simultaneously form a tip at the one end of the next succeeding lace, moving said tube of material along said lace to a predetermined extent in a direction away from said finished tip, separating a second section of said tube corresponding to the length of two tips, compressing said second section upon said lace and cutting through said second section and said lace to form a tip at the other end of said succeeding lace and to simultaneously form a tip at the one end of another succeeding lace.

4. In an apparatus for constructing tips for laces from a continuous tube of tip material and applying such to a continuous length of lace material extending through said tube, the combination of a support, means arranged to clamp said tube and movable relatively to said support whereby said tube is moved along said lace material and projected beyond the support and a die whereby said projecting portion of said tube is severed and compressed upon said lace material to form the tip.

5. In an apparatus for constructing tips for laces from a continuous tube of tip material and applying such to a continuous length of lace material extending through said tube, the combination of a support, a slide on said support adapted to clamp said tube and whereby the latter is moved along said lace material and projected beyond said support to a predetermined extent, and a die whereby said projecting portion of said tube is severed in two, said lace material is cut and said severed tube sections are compressed upon said lace material to simultaneously form tips at the opposed ends of two laces.

6. In an apparatus for constructing tips for laces from a continuous tube of tip material and applying such to a continuous length of lace material extending through said tube, the combination of a support movable lengthwise of said lace material, a slide on said support adapted to clamp said tube and whereby the latter is moved along said lace material and projected beyond said support to a predetermined extent, a die whereby said projecting portion of said tube is severed in two, said lace material is cut and said severed tube sections are compressed upon said lace material to simultaneously form tips at the opposed ends of two laces and a clamp on said support whereby said tube is clamped against movement relatively thereto.

7. In an apparatus for constructing tips for laces from a series of tubes of tip material arranged side by side and applying such to a series of continuous lengths of lace cords extending through said tubes, the combination of a support, a slide on said support adapted to clamp said tubes and whereby the latter are simultaneously moved along said lace cords and projected beyond said support to a predetermined extent, a die whereby said projecting ends are separated from said tubes and compressed upon said lace cords and cutting means in said die whereby said separated tube sections are each severed in two, said lace cords are cut and the severed ends of each tube section are rounded off to simultaneously form completed tips at the opposed ends of adjacent laces.

8. A die for the manufacture of tips for laces comprising a member having a depression formed therein the sides of which diverge outwardly in a direction transverse to the length of said depression and a second member adapted to coöperate with said first member.

9. A die for the manufacture of tips for laces comprising a member having an open ended depression formed therein the sides of which diverge outwardly in a direction transverse to the length of said depression, means for closing the one end of said depression to a predetermined extent and a second member coöperating with said first member.

10. A die for the manufacture of tips for laces comprising a lower and an upper member, said lower member being formed with a depression, a rib on the upper member adapted to enter and coöperate with said depressions to form the tip, a comb on said lower member projecting upwardly beyond the operative portion of said depression and a projection extending beyond the operative surface of said rib, said comb and projection coöperating to prevent the formation of a bur on the tip material as the tip is formed.

In testimony, that I claim the foregoing as my invention, I have signed my name in presence of two witnesses, this 17th day of January 1914.

FRIEDRICH KOCH.

Witnesses:
JEAN GRUND,
CARL GRUND.

Copies of this patent may be obtained for five cents each, by addressing the "Commissioner of Patents, Washington, D. C."